May 11, 1943. C. V. McCORMACK 2,319,008
CARRIAGE TRUCK
Filed May 8, 1942 2 Sheets-Sheet 1
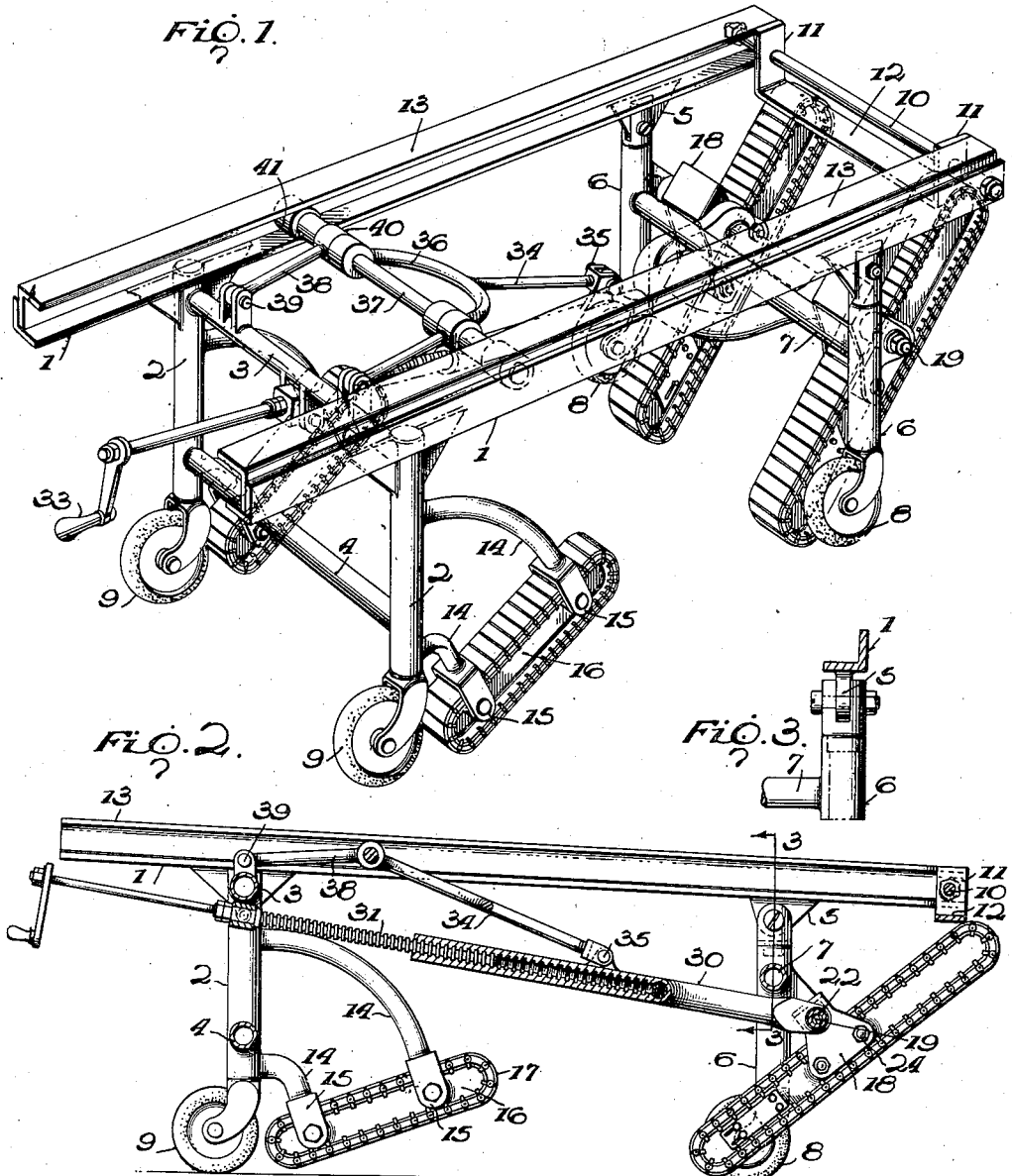
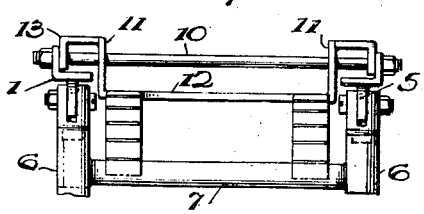
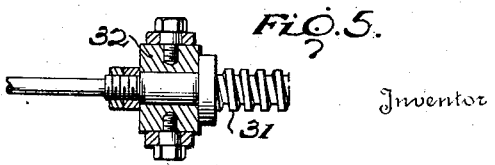
Inventor
Charles V. McCormack.
By Dyer + Kirchner
Attorneys May 11, 1943.   C. V. McCORMACK   2,319,008
CARRIAGE TRUCK
Filed May 8, 1942   2 Sheets-Sheet 2
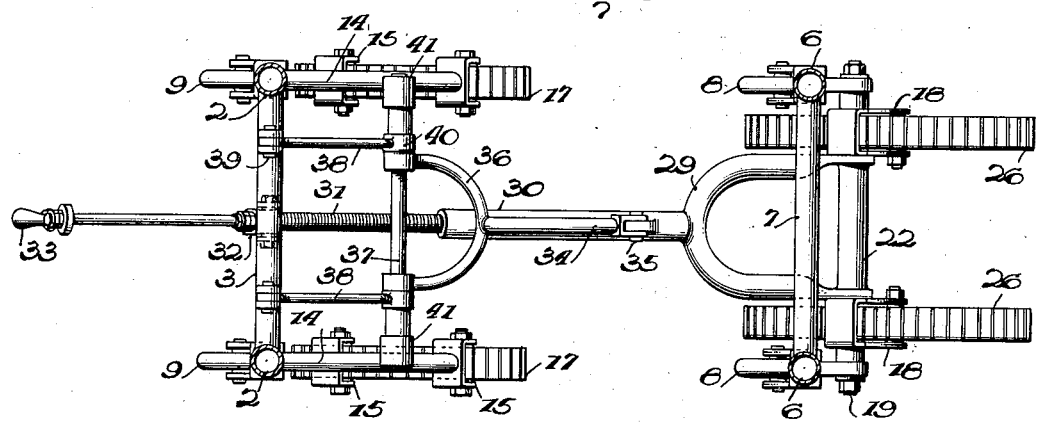
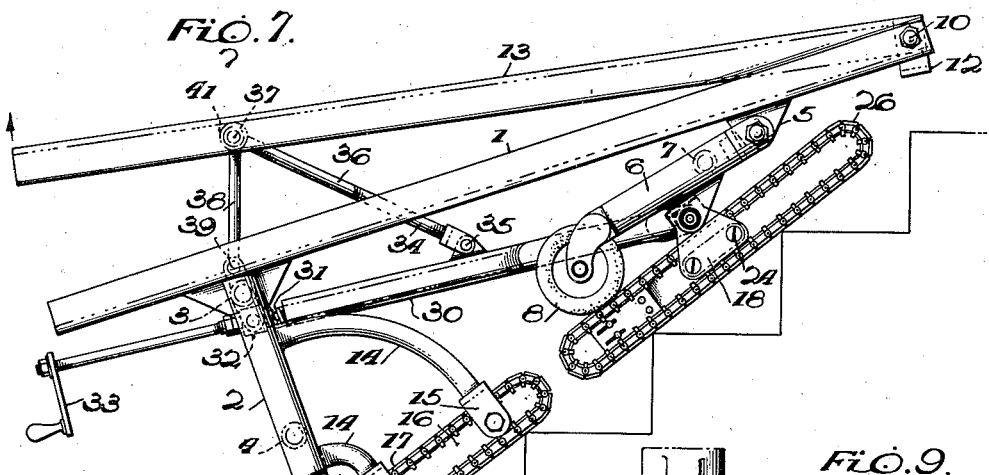
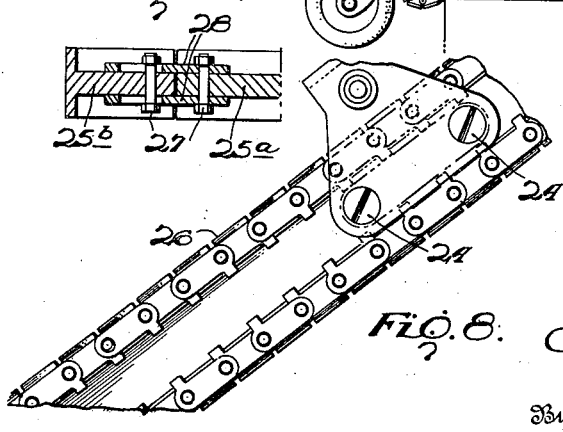
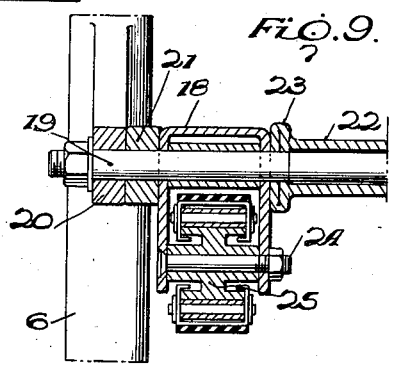
Inventor
Charles V. McCormack.
By Dyer & Kirchner
Attorneys Patented May 11, 1943

2,319,008

UNITED STATES PATENT OFFICE 2,319,008

CARRIAGE TRUCK

Charles V. McCormack, Chicago, Ill.

Application May 8, 1942, Serial No. 442,258

17 Claims. (Cl. 280—29)

The present invention relates to carriages of the truck type, and more particularly provides a vehicle capable of running on stairways or other inclined surfaces, as well as on level surfaces.

Vehicles constructed in accordance with the invention may be used as casket carriages in connection with funerals where it is necessary to transport a casket up and down stairways as well as along a level floor. The vehicle provided by the present invention combines wheels for supporting the carriage and its load on a level floor, with endless track devices adapted to support the vehicle and load on an inclined surface such as a stairway.

The principles of the invention are equally capable of being embodied in a truck for supporting a stretcher or bed surface on which a patient may be moved comfortably up and down stairs as well as across a floor.

With slight changes in design and style the invention is also useful in industrial establishments, such as factories, warehouses, stores and the like where it is at times necessary to move bulky or heavy loads up and down stairways.

Generally speaking, the carriage is provided with two distinct sets of floor or ground engaging running devices, one set comprising wheels, casters or the like for operating over a level floor, and the other set comprising endless track devices disposed at an appropriate angle for engaging simultaneously a plurality of points on a stairway, so that the vehicle may be smoothly operated up or down the stairway. In a preferred embodiment certain of the wheels are made retractable from their normal floor engaging position so as automatically to project endless track devices into stair engaging position.

A useful feature of the invention, in a preferred embodiment, resides in the combination with such retractable means of a mechanism for automatically maintaining a load supporting bed in substantially horizontal or level position regardless of the supporting elements, i. e., the wheels or endless track devices, which may be projected for supporting the carriage on a floor or stairway.

Further objects are concerned with providing a vehicle of the class described which will be inexpensive to manufacture, efficient and durable in use, and convenient and easy to operate.

In the attached drawings, which show a single preferred embodiment of the invention selected to illustrate the inventive concept, Figure 1 is a perspective phantom view of a vehicle constructed according to the principles of the invention;

Fig. 2 is a central longitudinal section;

Fig. 3 is a detail sectional view on the line 3—3 of Fig. 2;

Fig. 4 is a fragmentary front end elevational view;

Fig. 5 is a detail cross-sectional view of the operating screw shaft bearing;

Fig. 6 is a plan view of the running gear;

Fig. 7 is a side elevational view showing the carriage arranged for operation on a stairway;

Fig. 8 is a fragmentary side elevational view of one of the forward endless track devices;

Fig. 9 is a detail section through a forward endless track device at its mounting rod; and Fig. 10 is a detail longitudinal section of one of the forward endless track devices showing a combined slack take-up and counterweight.

The structure comprises a frame composed essentially of a pair of side sills 1, each conveniently made of a length of angle iron having an inwardly directed horizontal flange and an outer vertical flange. These side sills are connected and rigidified near one end portion, which may be designated the rear end, by rear legs or wheel posts 2 connected by an upper cross brace 3 and a lower cross brace 4. At the forward end portion each side sill has a depending ear 5 to which is pivoted a forward leg or wheel post 6. The two forward wheel posts are rigidly connected by a cross brace 7. Wheels or casters 8 are mounted in vertical pivots at the bottoms of the forward wheel posts, and rear wheels or casters 9 are similarly mounted at the bottoms of the rear wheel posts.

A forward end rod 10 connects and rigidifies the side sills 1 at their extreme forward ends, passing loosely through openings in the short vertical legs 11 of a U-shaped plate 12. The rod 10 is journalled in the vertical flanges of the side sills and the legs 11 of plate 10 are welded to the horizontal flanges of the angle sections 13 which are nested with the side sills and provide a tiltable bed pivoted to the side sills through the medium of the rod 10. Cross strips or braces (not shown) may connect the angle sections 13 for holding them in rigidly spaced relation and for completing the bed which they constitute.

It will be obvious that the structure thus far described comprises a wheeled carriage of generally familiar form which can be pushed or pulled as a truck over any substantially continuous or level surface and which can be turned by pivoting of the wheels 8 and 9 in the respective wheel posts.

It is an object of the invention to render the carriage capable of traveling on stairways and other surfaces which are not continuous or level. This is accomplished by means of endless track devices which will now be described.

Forwardly extending from each of the rear wheel posts 2 are a pair of fixed arms 14, each terminating in a stirrup 15 through which is bolted a plate structure 16 mounting an endless track 17. The latter is of any usual construction, including jointed tread elements adapted to travel around the plate structure 16 in a well understood manner. Each of the rear endless track devices is rigidly mounted by its arms 14 so as to project forwardly and upwardly from lowermost points which are positioned in front of the rear wheels 9 and slightly above the bottoms of those wheels.

A pair of stirrup brackets 18 are secured, as by nuts threaded on the ends of a transverse mounting rod 19, to ears 20 rigidly outstanding from the forward wheel posts. A spacing washer 21 may be used to separate each stirrup bracket 18 from the adjacent ear 20, and the two stirrup brackets are spaced apart on the rod 19 by a sleeve 22 and the interposed apertured ears 23 of a yoke 29 which will be hereinafter described.

Each stirrup bracket is enlarged lengthwise in the lower portions of its sides, and a pair of bolts 24 passed through these sides secure in each stirrup bracket the plate structure 25 of a forward endless track 26, which may be made substantially identical to the rear endless tracks.

The forward endless track devices freely swing by the pivotal mounting of their stirrup brackets on the rod 19, and in the normal positioning of the parts, with the forward wheels 8 resting on level ground as shown in Figs. 1 and 2, the rear ends of the forward endless track devices overbalance the front ends, so that each device hangs at the inclination as shown in Figs. 1 and 2. In order to make certain that these devices will thus hang, it is convenient to make each of the plate structures 25 in two sections, consisting of a main section 25a and a short rear section 25b, the latter being rather heavily weighted and connected with the main section by through bolts 27 and slotted clamping plates 28 all as best shown in Fig. 10. The slotted connection permits lengthwise adjustment of the plate structure 25 to take up slack, and the section 25b acts as a counterweight for maintaining the rear end of the track devices in depressed position.

Each of these forward endless track devices is so proportioned that it will normally hang as shown in Fig. 2, where its rear end is spaced above the bottom of the adjacent wheel 8 and its forward end abuts the cross plate 12.

It will be evident that with the forward parts of the structure constructed and arranged as shown in Figs. 1 and 2, none of the endless track devices offers any interference to free movement of the carriage over a level surface.

In order to adjust the parts to the positions shown in Fig. 7, so that the carriage may move on the endless track devices up or down a stairway, it is necessary to retract the forward wheels and thereby expose the forward endless track devices for engagement with the inclined and interrupted or discontinuous surface. A convenient mechanism for effecting this retraction comprises a yoke 29 having the terminal apertured ears 23 heretofore mentioned at the ends of the spacing sleeve 22 on the rod 19. From the bight of this yoke 29 a hollow screw 30 extends rearwardly and is meshed with a screw shaft 31 passing through a pivoted bearing block 32 mounted on the upper brace rod 3 of the rear wheel posts 2. The screw shaft thread terminates short of the bearing block 32 and the shaft extends rearwardly therefrom to a crank handle 33 by which it may be turned in the hollow screw 30 to advance and retract the yoke 29 and thereby swing the rod 19 to retract or project the forward wheel posts 6. When these wheel posts are fully projected their associated wheels 8 are engageable with the ground and their associated endless track devices swing clear of the ground, but when these wheel posts are retracted their endless track devices are exposed for engagement with an inclined surface, which may be a discontinuous or interrupted one like the corners formed by the stair treads and risers in Fig. 7. Since the forward endless track devices swing freely by the pivoted engagement of their stirrup brackets 18 with the rod 19, each of these devices is free to assume a position in alignment with the rear endless track devices, so that the carriage will be well supported by all the endless track devices, as best shown in Fig. 7.

It will be appreciated that the carriage frame top, composed of the side sills 1, will not be disposed in a horizontal or level plane when the forward wheels are retracted and the carriage is positioned on a stairway. It is desirable that the load borne by the frame be maintained always in an approximately horizontal position, and for this reason I prefer to incorporate with the retracting mechanism some means for automatically leveling the bed forming members 13 when the retracting mechanism is operated.

A convenient form of such mechanism comprises the toggle or knuckle arrangement shown in the drawings, which includes an arm 34 pivoted at 35 to the hollow screw 30 and extending rearwardly as a pair of branches 36 in which is journalled a roller rod 37. Struts 38 are pivoted at 39 to the upper cross brace 3 and at their forward ends have bearings 40 through which the roller rod 37 passes. Rollers 41 are rotatably mounted on the ends of the rod 37 and are positioned between the respective horizontal flanges of the angles 1 and 13.

It will be evident that retraction of the forward wheels, involving rearward movement of the hollow screw 30, will elevate the rollers 41 against the angle sections 13 so as to lift these angle sections about the pivots by which they are connected to the forward end of the frame, while projection of the forward wheels will result in lowering the members 13. In this way the bed of the carriage is maintained approximately or sufficiently level or horizontal at all times, without regard to the grade or degree of inclination of the surface on which the carriage may be supported.

When retracted, the forward wheels 8 will swing about their pivot axes in the wheel posts 6, so as to hang down as shown in Fig. 7. It is not necessary that in fully retracted position these wheels engage the side sills 1 or any other part of the frame, since good support for the bed or frame is provided forwardly through the stirrup brackets 18, rod 19, ears 20, wheel posts 6 and ears 5, as well as rearwardly through the brackets 18, rod 19, yoke 29, screw members 30 and 31, bearing block 32, and upper cross brace 3, the degree of pitch of the threads being ample to prevent turning of the screw shaft through force of the weight of the load carried by the truck. This inherent resistance to turning is important because the pitch of the inclined surface over which the carriage must in ordinary use travel is seldom uniform, so that in actual operation, the degree of retraction will vary considerably. Hence it is not necessary always to retract the forward wheels fully, so as to bring them into engagement with the upper parts of the frame, where they might provide direct support for the forward stirrup brackets 18 and endless track devices.

In the illustrated embodiment I have shown the vehicle designed in the somewhat massive style currently in vogue for casket carriages. Of course this style will be altered when the vehicle is designed for other purposes, such as industrial applications, hospital patient use, etc.

It will be understood also that the frame and bed parts are shown stripped and somewhat skeletonized. In actual practice the vehicle will be more completely trimmed and completed with a closed bed, and various appurtenances, such as anti-skid blocks, clamping elements and the like will be added to facilitate holding any desired kind of lading on the bed.

I claim:

1. A carriage comprising a frame, front and rear wheels mounted on the frame including two of such wheels pivotally mounted as a retractable unit on the frame, all of the wheels normally presenting tread portions in a single plane for supporting the carriage on a level surface, an endless track device carried by the frame and disposed in a plane making an angle with the first named plane, and means for pivotally swinging said two retractable wheels from said first named plane whereby the carriage may be supported by said endless track device on an inclined surface while said two wheels are retracted therefrom.

2. A carriage comprising a frame, a pair of wheels at each end of the frame, each pair being mounted as a unit and all of the wheels normally presenting tread portions in a single plane for supporting the carriage on a level surface in said plane, an endless track device positioned adjacent to one of said pairs of wheels, above said plane, and at an angle thereto, means for retracting the other pair of wheels from said plane, and an endless track device cooperating with said retractable wheels and movable into substantial alignment with the first named endless track device when said wheels are retracted whereby the carriage may be supported on an inclined surface engaged by both of the endless track devices.

3. A carriage comprising a frame, a pair of wheels at each end of the frame, each pair being mounted as a unit and all of the wheels normally presenting tread portions in a single plane for supporting the carriage on a level surface in said plane, means for retracting one pair of wheels, and an endless track device mounted adjacent to each pair of wheels and adapted to be brought into mutual substantial alignment in a plane inclined to the first plane when the retractable wheels are retracted whereby the carriage may be supported on an inclined surface by said devices.

4. A carriage comprising a frame, wheel means at one end of the frame, an endless track device juxtaposed to said wheel means and upwardly sloping from a point forwardly and above the level of the bottom of said wheel means, wheel means at the other end of the frame, an endless track device juxtaposed to said latter wheel means and above the level of the bottom thereof, and mechanism for simultaneously retracting said latter wheel means to a position above its juxtaposed endless track device and moving the latter into substantial alignment with the first named endless track device whereby the carriage may be supported solely by said endless track devices on an inclined surface.

5. A carriage comprising a frame, wheel means at one end of the frame, an endless track device juxtaposed to said wheel means and upwardly sloping from a point forwardly and above the level of the bottom of said wheel means so that the tread plane of the endless track device passes below the bottom of the wheel means, wheel means at the other end of the frame, an endless track device juxtaposed therewith wholly above the level of the bottom of the adjacent wheel means and having a tread plane sloping forwardly and upwardly, and means for retracting the last named wheel means to bring its bottom above the plane of the adjacent endless track device so that the carriage may be supported on an inclined surface by both of said endless track devices exclusively.

6. A carriage comprising a frame, fixed wheels at the rear thereof with a fixed forwardly and upwardly sloping endless track device mounted adjacent to each wheel and above the level of the bottom thereof, retractable wheels at the front of the frame, a forwardly and upwardly sloping endless track device mounted adjacent to each front wheel and above the level of the bottom thereof, and means for retracting said front wheels, said endless track devices being adapted to support the carriage free of said wheels when the front wheels are retracted and said wheels being adapted to support the carriage free of the endless track devices when the front wheels are in projected position.

7. A carriage comprising a frame, a plurality of wheels normally supporting the frame, front and rear endless track devices mounted on the frame and normally upwardly and forwardly sloping above the level of the bottoms of the wheels so as to be clear of a level surface on which the wheel bottoms rest, and means for retracting at least certain of said wheels so that the endless track devices may extend in a substantially common plane below the level of the wheel bottoms and constitute the exclusive support for the carriage on an inclined surface.

8. In a carriage, a frame, a plurality of wheels carried by the frame for normally supporting the carriage on a level surface, a plurality of endless track devices carried by the frame for supporting the carriage on an inclined surface, means for alternatively projecting the wheels and the endless track devices into surface-engaging position, and a load-supporting bed pivoted to the frame and adjustable to substantially horizontal position when either the wheels or the endless track devices are in surface-engaging position.

9. In a carriage, a frame, a plurality of wheels carried by the frame for normally supporting the carriage on a level surface, a plurality of endless track devices carried by the frame for supporting the carriage on an inclined surface, means for alternatively projecting the wheels and the endless track devices into surface-engaging position, a load-supporting bed pivoted to the frame, and means cooperating with the projecting means for automatically adjusting the bed to substantially horizontal position when the projecting means is actuated.

10. In a carriage, a frame, a load-supporting bed mounted on the frame, a plurality of wheels carried by the frame for normally supporting the carriage on a level surface, a plurality of endless track devices carried by the frame for supporting the carriage on an inclined surface, and common means for alternatively projecting the wheels and the endless track devices into surface-engaging position and adjusting the bed to substantially horizontal position.

11. In a carriage, a frame, a load-supporting bed having one end pivoted to the frame, a plurality of wheels carried by the frame for normally supporting the carriage on a level surface, a plurality of endless track devices carried by the frame for supporting the carriage on an inclined surface, and common means for alternatively projecting the wheels and the endless track devices into surface-engaging position and swinging the bed about its pivot to substantially horizontal position.

12. In a carriage, a frame, a load-supporting bed having one end pivoted to the frame, a plurality of wheels and endless track devices mounted on the frame and alternatively engageable with a level surface or an inclined surface, respectively, for supporting the carriage, means for projecting the wheels and endless track devices alternatively into surface-engaging position, and means cooperating with the projecting means comprising a toggle connection between the frame and bed for swinging the bed about its pivot to maintain the bed substantially horizontal when either the wheels or the endless track devices are in surface-engaging position.

13. In a carriage, a frame, rollable means carried by the frame for normally supporting the carriage on a level surface, other rollable means carried by the frame for supporting the carriage on an inclined surface, means for alternatively projecting one or the other of said means into surface-engaging position, a load-supporting bed pivoted to the frame, and means cooperating with the projecting means for automatically adjusting the bed to substantially horizontal position when the projecting means is actuated.

14. In a carriage, a frame, rollable means carried by the frame and having a plurality of tread points approximately equally spaced below the top of the frame for normally supporting the carriage on a level surface, other rollable means carried by the frame and having a plurality of tread points disposed in a plane forming an acute angle with the top of the frame for supporting the carriage on an inclined surface, means for alternatively projecting one or the other of said means into surface-engaging position, a load-supporting bed pivoted to the frame, and means cooperating with the projecting means for automatically adjusting the bed to substantially horizontal position when the projecting means is actuated.

15. A carriage comprising a frame having an upper normally horizontal surface, front and rear wheels mounted on the frame and having their axes normally disposed in a single plane parallel to the upper surface of the frame for supporting the carriage on a level surface, front and rear endless track means mounted on the frame, and mechanism for positioning the endless track means in substantial alignment in a plane forming an acute angle with the plane of the upper surface of the frame and for positioning the plane of the wheel axes at a smaller angle to said surface of the frame in order to expose the endless track means for supporting the carriage on an inclined surface.

16. A carriage comprising a frame having an upper normally horizontal surface, front and rear wheels mounted on the frame and having their treads normally arranged to present supporting portions lying in a single plane parallel to the upper surface of the frame for supporting the carriage on a level surface, endless track means mounted on the frame, and mechanism for positioning the endless track means in a plane forming an acute angle with the plane of the upper surface of the frame and for positioning the plane of the supporting portions of the wheel treads at a smaller angle to said surface of the frame in order to expose the endless track means for supporting the carriage on an inclined surface.

17. A carriage comprising a frame having an upper normally horizontal surface, front and rear wheels mounted on the frame and having their treads normally arranged to present supporting portions lying in a single plane parallel to the upper surface of the frame for supporting the carriage on a level surface, an endless track device mounted on the frame, and mechanism for simultaneously moving the endless track device and at least some of the wheels to position the endless track device in a plane forming an acute angle with the plane of the upper surface of the frame and to position the plane of the supporting portions of the wheel treads at a smaller angle to said surface of the frame in order to expose the endless track device for supporting the carriage on an inclined surface.

CHARLES V. McCORMACK.